US008336028B2

(12) United States Patent
Hinton et al.

(10) Patent No.: US 8,336,028 B2
(45) Date of Patent: Dec. 18, 2012

(54) EVALUATING SOFTWARE SUSTAINABILITY BASED ON ORGANIZATIONAL INFORMATION

(75) Inventors: Heather M. Hinton, Austin, TX (US); Ivan M. Milman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1422 days.

(21) Appl. No.: 11/944,984

(22) Filed: Nov. 26, 2007

(65) Prior Publication Data
US 2009/0138843 A1    May 28, 2009

(51) Int. Cl.
*G06F 9/44* (2006.01)
*G06Q 10/00* (2012.01)

(52) U.S. Cl. ........ 717/123; 717/101; 717/107; 717/126; 717/131; 705/7.36

(58) Field of Classification Search ......................... None
See application file for complete search history.

(56) References Cited

U.S. PATENT DOCUMENTS

| | | | |
|---|---|---|---|
| 4,370,707 A * | 1/1983 | Phillips et al. ........................ 1/1 |
| 5,729,746 A * | 3/1998 | Leonard ........................ 717/101 |
| 6,961,687 B1 | 11/2005 | Myers, Jr. et al. |
| 7,117,504 B2 * | 10/2006 | Smith et al. ................... 719/328 |
| 7,150,001 B1 * | 12/2006 | Pepin et al. .................... 717/107 |
| 7,171,652 B2 * | 1/2007 | Motoyama et al. ............ 717/123 |
| 7,533,369 B2 * | 5/2009 | Sundararajan et al. ....... 717/123 |
| 7,596,778 B2 * | 9/2009 | Kolawa et al. ................ 717/126 |
| 7,644,414 B2 * | 1/2010 | Smith et al. ................... 719/328 |
| 7,669,180 B2 * | 2/2010 | Bassin et al. .................. 717/101 |
| 7,672,921 B1 * | 3/2010 | Clay et al. ........................ 706/45 |
| 7,712,087 B2 * | 5/2010 | Kogan et al. .................. 717/131 |
| 7,747,987 B1 * | 6/2010 | Akarte et al. .................. 717/131 |
| 8,225,292 B2 * | 7/2012 | Naslavsky et al. ............ 717/126 |
| 2003/0046661 A1 * | 3/2003 | Farber et al. .................. 717/107 |
| 2003/0070157 A1 * | 4/2003 | Adams et al. .................. 717/101 |
| 2005/0283751 A1 * | 12/2005 | Bassin et al. .................. 717/100 |
| 2006/0059061 A1 | 3/2006 | Oey |
| 2007/0006152 A1 * | 1/2007 | Ahmed et al. ................ 717/122 |
| 2007/0016432 A1 * | 1/2007 | Piggott et al. ..................... 705/1 |

(Continued)

OTHER PUBLICATIONS

"Measuring Software Sustainability", Robert C Seacord et al., [Online], pp. 1-10, 2003 IEEE, [Retrived on Oct. 12, 2011], [Retrieved from Internet], <http://ieeexplore.ieee.org/stamp/stamp.jsp?tp=&arnumber=1235455>.*

(Continued)

*Primary Examiner* — Thuy Dao
*Assistant Examiner* — Ziaul A Chowdhury
(74) *Attorney, Agent, or Firm* — Stephen J. Walder, Jr.; Jeffrey S. LaBaw

(57) ABSTRACT

Mechanisms for evaluating software sustainability are provided. The illustrative embodiments provide code scanning tools for identifying authors of portions of a software product and various attributes about the development, maintenance, and improvement of portions of the software product over time. This information may be correlated with organizational information to identify portions of the software product that may be lacking in sustainability by the persons currently associated with the software organization. Moreover, this information may be used to obtain information regarding the relative quality of the composition or conception of portions of the software product, portions of the software product that have required a relatively larger amount of resources to develop over time, a relative indication of which portions of the software product are "harder" or "easier" to sustain and who is associated with those portions of the software product, and the like.

17 Claims, 9 Drawing Sheets

U.S. PATENT DOCUMENTS

| | | | |
|---|---|---|---|
| 2007/0083421 A1* | 4/2007 | McNair et al. | 705/10 |
| 2007/0100967 A1* | 5/2007 | Smith et al. | 709/219 |
| 2008/0033897 A1* | 2/2008 | Lloyd | 706/19 |
| 2008/0141214 A1* | 6/2008 | Olson | 717/101 |
| 2008/0319812 A1* | 12/2008 | Sousa et al. | 705/7 |
| 2009/0228242 A1* | 9/2009 | Nassar | 702/186 |

OTHER PUBLICATIONS

Gardner Mwansa, "Deployment of a Sustainable, Production-Grade VoIP System", [Online], Aug. 2007, pp. 1-114, [Retrieved from Internet on Aug. 3, 2012], <http://wwwisis.unam.na/theses/mwansa2008.pdf>.*

Richard Carbone et al., "Life-Cycle Support for Information Systems Based on Free and Open Source Software" [Online], 2006, pp. 1-28, [Retrieved from Internet on Aug. 3, 2012], <http://www.dodccrp.org/events/11th_ICCRTS/html/papers/136.pdf>.*

Mary Ann Lapham , "Sustaining Software-Intensive Systems" [Online], May 2006, pp. 1-53, [Retrieved from Internet on Aug. 3, 2012], <http://www.dtic.mil/cgi-bin/GetTRDoc?AD=ADA453287>.*

John D. McGregor et al., "A Method for Analyzing Software Product Line Ecosystems", [Online], 2010, pp. 73-80, [Retrieved from Internet on Aug. 3, 2012], <http://delivery.acm.org/10.1145/1850000/1842773/p73-mcgregor.pdf>.*

Pfeiffer et al., "Visualisation-Based Tool Support for the Development of Aspect-Oriented Programs", ACM, AOSD 06, Mar. 20-24, 2006, pp. 146-157.

Gabriel et al., "Conscientious Software", Sun Microsystems, Inc., ACM, OOPSLA'06, Oct. 22-26, 2006, pp. 433-450.

Taylor et al., "Software Design and Architecture", IEEE Computer Society, Future of Software Engineering (FOSE'07), 2007, 18 pages.

Biddle et al., "No Name: Just Notes on Software Reuse", ACM, OOPSLA'03, Oct. 26-30, 2003, pp. 240-260.

Hecht et al., "The Role of Safety Analyses in Reducing Products Liability Exposure in "Smart" Consumer Products Containing Software and Firmware", IEEE, 2003 Proceedings Annual Reliability and Maintainability Symposium, Jan. 27-30, 2003, pp. 153-158.

* cited by examiner

FIG. 8C

Package Explorer

| | Complexity | |
|---|---|---|
| | Function Points | Lines of Code |
| Hedy Lamar -Total | 7070 | 35900 |
| Hard  src.artifactsvc.source.com.ibm.prodname.funcA | 5425 | 31000 |
|   funcAFactory.java | 3000 | 16500 |
|   funcAService.java | 2475 | 14500 |
| Medium  src.artifactsvc.source.com.ibm.prodname.funcA | | |
|   funcAException.java | 1645 | 4900 |
| Easy  none | | |
| John Doe -Total  Hard | 4391  0 | 0 |
| .... | | |
| Craig LaTour  .... (note point that Craig has modified EVERYTHING that John has –so investigate if one of these two is useless) | | |

Sustainability report by programmer

Hedy Lamar
  Hard –100 KLOC
  Medium –1.3 KLOC
  Easy –100 LOC

John Doe
  Hard –723 LOC
  Medium –10.2 KLOC
  Easy –1024 LOC

Craig LaTour
  Hard –2313 LOC
  Medium –12.1 KLOC
  Easy –36.1 KLOC

840

EVALUATING SOFTWARE SUSTAINABILITY BASED ON ORGANIZATIONAL INFORMATION

BACKGROUND

1. Technical Field

The present application relates generally to an improved data processing system and method. More specifically, the present application is directed to a system and method for evaluating software sustainability.

2. Description of Related Art

In today's world where computers are integrated into every facet of business and individual lives, software and its development becomes increasingly important. While it takes a great deal of time and effort to develop software products, often involving many different individuals working on various parts of the software product, it also takes a great deal to time, effort, and knowhow to maintain software products and improve upon them with new innovations. However, the nature of the software industry is that individuals often move from one company to another taking their knowhow and expertise with them when the move to their new positions with new employers.

Often business and individuals are interested in acquiring ownership of companies whose main product is software. As part of the process for evaluating a software based organization for an acquisition, there is a need to evaluate how much of a given software product's "core developers" and "core innovators" are still involved with the product and how people have grown/contributed to the software product over time. This will allow the evaluators to determine if a product still has the key resources necessary to drive innovation, development, and continued software maturity. In many cases, much of the core software asset has been contributed by people who have left the organization. Thus, even though the organization has functioning software, the ability to sustain, service, and grow the software asset is lacking.

Current approaches to evaluating sustainability and capacity for innovation are ad hoc and are primarily based on human review of the code and its associated documentation. Sometimes, the potential acquirer of the software organization must interview the developers and architects of the software product to obtain needed information for determining the software product's sustainability. However, such interviews are often limited in scope due to the need to maintain secrecy around a potential acquisition.

SUMMARY

The illustrative embodiments provide a system and method for evaluating software sustainability. The illustrative embodiments provide code scanning tools for identifying authors of portions of a software product and various attributes about the development, maintenance, and improvement of portions of the software product over time. This information may be correlated with organizational information to identify portions of the software product that may be lacking in sustainability by the persons currently associated with the software organization. Moreover, this information may be used to obtain information regarding the relative quality of the composition or conception of portions of the software product, portions of the software product that have required a relatively larger amount of resources to develop over time, a relative indication of which portions of the software product are "harder" or "easier" to sustain and who is associated with those portions of the software product, and the like. Moreover, the mechanisms of the illustrative embodiments may provide functionality for validating what areas of a software product different authors have contributed to in order to validate/corroborate assertions of who does what and how important each person is to the on-going development and maintenance of the software product.

The illustrative embodiments provide mechanisms for generating textual/graphical reports of sustainability of a software product by the particular software organization. These reports may provide a representation of the software product and software organization from various viewpoints so as to facilitate looking at the software organization based on a variety of different sustainability criteria. These reports may be output by a computing system for use by a human user in evaluating the sustainability of a particular software product. A relative ranking of the software product may be provided to indicate whether the software product is highly sustainable or has a significant lack of sustainability in various areas. The automated mechanism of the illustrative embodiments minimizes the amount of manual review of code and documentation required by the evaluator and provides insight into the way in which the software product has been developed as well as the potential for future sustainability of the software product based on the knowledge and know-how available within the software organization.

In one illustrative embodiment, a method for providing an output indicative of a sustainability of a software product is provided. The method may comprise extracting metadata from source code of the software product, the metadata identifying at least one historical characteristic of the source code of the software product, the at least one historical characteristic identifying information regarding the development or maintenance of the source code of the software product. Moreover, the method may comprise correlating the metadata with current information of an organization responsible for providing the software product, determining a sustainability measure of the source code of the software product based on results of correlating the metadata with the current information of the organization, and generating one or more report outputs based on the determined sustainability measure of the source code of the software product. The metadata may comprise at least one of one or more identifiers associated with one or more persons responsible for modifying the source code, one or more timestamps associated with one or more modifications of the source code, or one or more measures of complexity of the source code.

The metadata may comprise at least one measure of complexity of the source code. The at least one measure of complexity may be a measure of the relative complexity of the source code compared to other portions of source code of the same software product. The at least one measure of complexity may be automatically assigned to the source code and stored in the metadata by scanning the source code to identify attributes of the source code, comparing the attributes to criteria for assigning function points to the source code, and calculating a total number of function points for the source code based on a function of the attributes compared to the criteria. The at least one measure of complexity may comprise a history having a plurality of measures of complexity, each measure of complexity being associated with a corresponding timestamp in the metadata of a modification to the source code.

Determining a sustainability of the source code of the software product based on results of correlating the metadata with the current information of the organization may comprise determining if at least one person responsible for modification of the source code is currently in a position to provide support for the software product based on the correlation of the metadata with the current information of the organization. Moreover, determining a sustainability of the source code may further comprise calculating the sustainability measure based on results of determining if at least one person responsible for modification of the source code is currently in a position to provide support for the software product.

Calculating the sustainability measure may comprise determining if the metadata associated with the source code indicates a high complexity or high number of lines of code and calculating a relatively low sustainability measure if the complexity of the source code is high, or the number of lines of code is high, and one or more of the persons responsible for modification of the source code are not in a current position to provide support for the software product. Furthermore calculating the sustainability measure may comprise determining if the source code has been modified within a specified time period, determining if a pattern of modifications of the source code indicates a need for continued support of the source code, and calculating a relatively low sustainability measure if the source code has been modified within the specified time period or the pattern of modifications of the source code indicates a need for continued support of the source code, and one or more persons responsible for modification of the source code are not in a current position to provide support for the software product.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is an exemplary diagram of an alternative report that may be generated in accordance with one illustrative embodiment;

FIGS. 8A-8D are exemplary diagrams of other alternative reports, that may be generated in accordance with one illustrative embodiment, in which complexity of the portions of source code is the key factor.

DETAILED DESCRIPTION OF THE ILLUSTRATIVE EMBODIMENTS

Figure 1:
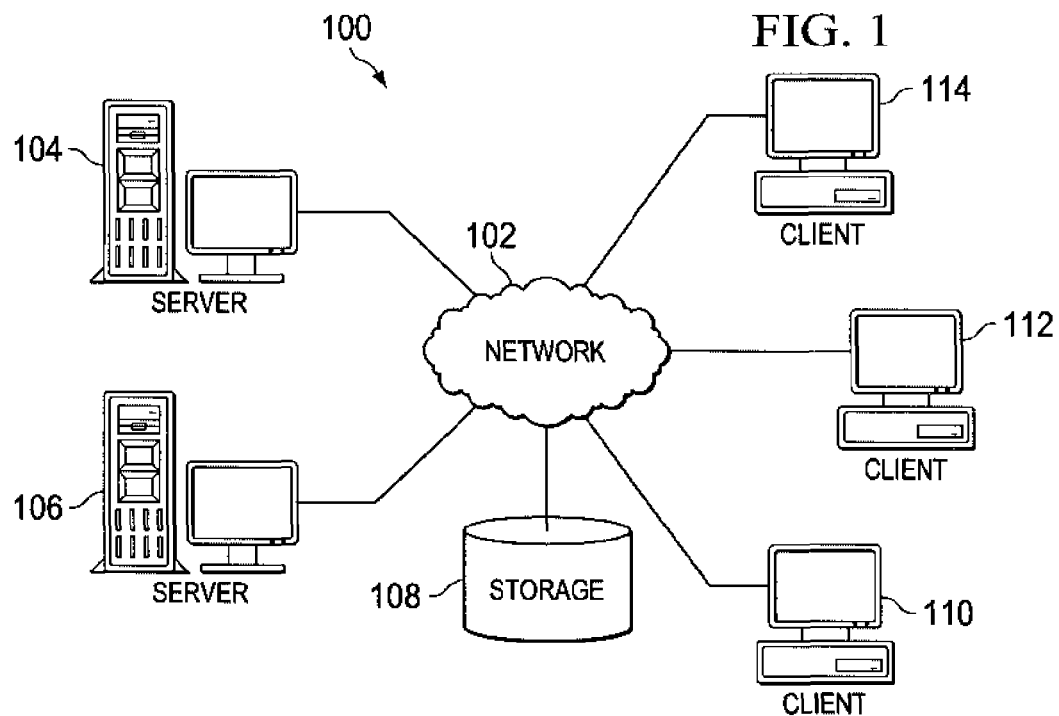
FIG. 1 is an exemplary representation of an exemplary distributed data processing system in which aspects of the illustrative embodiments may be implemented.
Figure 2:
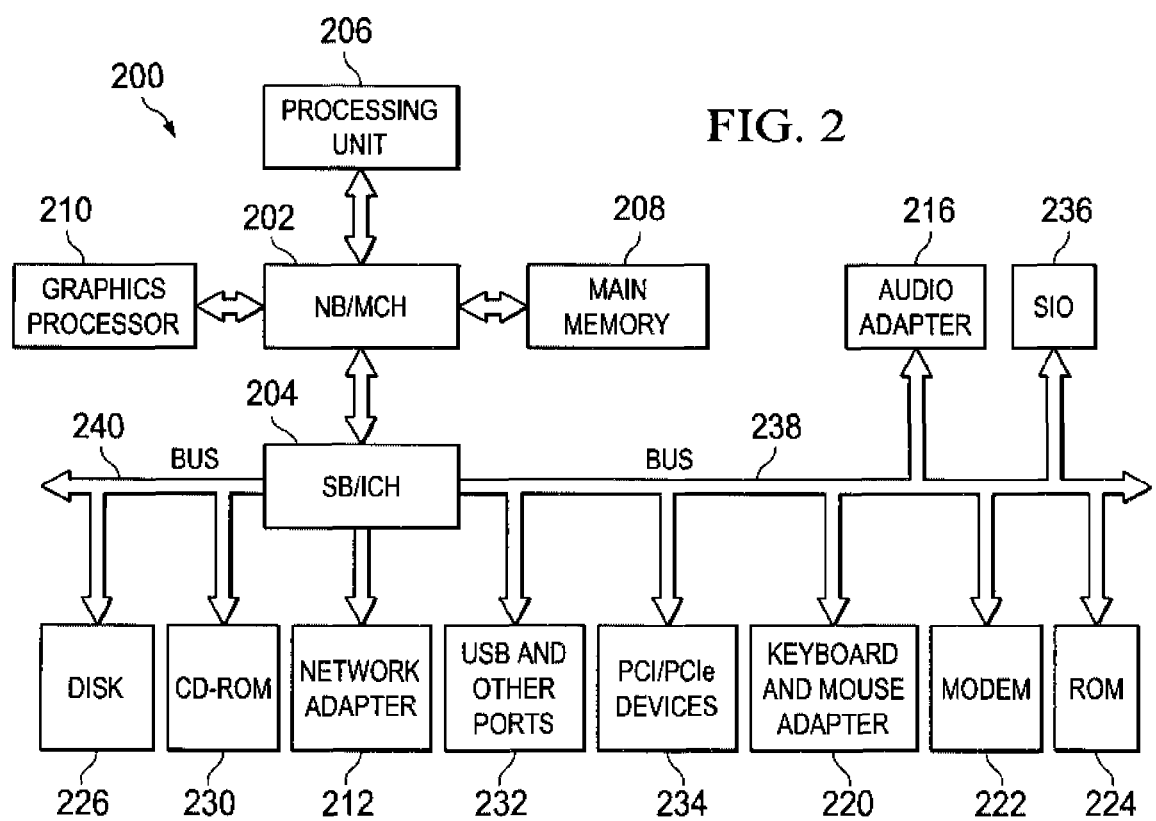
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Returning to FIG. 1, it should be appreciated that in a software development environment, many different human developers may be working on various portions, or even the same portions, of a software product. For example, there may be many different developers using their respective client computing devices 110-114 to edit source code stored on one or more servers 104 and 106 of a software organization, i.e. a business or enterprise whose business is the development and support of software products. Many of these individuals may move on to other organizations or even be moved within an organization, such that they are not able to provide the same support for the portions of the source code that they worked on at a later time. As a result, the sustainability of those portions of source code may be degraded from the viewpoint of a potential acquirer of the software organization. Thus, while the software organization may have a functioning software product, the sustainability of that software product in the future may be significantly lessened by the loss of personnel or movement of personnel within the organization. Therefore, it would be beneficial to be able to identify the sustainability of a software product based on the current personnel of the software organization and information about the development and maintenance of the software product.

The illustrative embodiments provide a system and method for evaluating software sustainability. The illustrative embodiments provide code scanning tools for identifying authors of portions of a software product and various attributes about the development, maintenance, and improvement of portions of the software product over time. This information may be correlated with organizational information to identify portions of the software product that may be lacking in sustainability based on the availability of persons currently associated with the software organization. Moreover, this information may be used to obtain information regarding the relative quality of the composition or conception of portions of the software product, portions of the software product that have required a relatively larger amount of resources to develop and maintain over time, a relative indication of which portions of the software product are "harder" or "easier" to sustain and who is associated with those portions of the software product, and the like. For example, the mechanisms of the illustrative embodiments provide functionality for identifying areas of the software product that are likely to be higher quality, e.g., because they were primarily developed by a known developer or team, versus lower quality, e.g., because they were primarily developed by a developer or team who developed other portions of the software product that are known to have bugs/flaws in the code.

The illustrative embodiments provide mechanisms for generating textual/graphical reports of sustainability of a software product by the particular software organization. These reports may provide a representation of the software product and software organization from various viewpoints so as to facilitate looking at the software organization based on a variety of different sustainability criteria. These reports may be output by a computing system for use by a human user in evaluating the sustainability of a particular software product. A relative ranking of the software product may be provided to indicate whether the software product is highly sustainable or has a significant lack of sustainability in various areas. The automated mechanism of the illustrative embodiments minimizes the amount of manual review of code and documentation required by the evaluator and provides insight into the way in which the software product has been developed as well as the potential for future sustainability of the software product based on the knowledge and know-how available within the software organization.

With the mechanisms of the illustrative embodiments, initially a programmer or developer establishes a profile with the software organization's development system or environment. The profile may contain identification information that may be used when editing software source code so as to keep track of the individuals that have contributed to the development of individual portions of the source code. For example, the developer's profile may contain the individual's name and electronic mail address. An identifier may be associated with the developer's profile, e.g., an identification number, alphanumeric text, or the like, which can be used as a tag within the source code for linking the developer's profile with particular portions of the software source code. In one illustrative embodiment, the tag that is used within the source code is the developer's name and electronic mail address, although other illustrative embodiments may utilize other types of tags which may be correlated with individual developer profiles in accordance with the present invention.

These profiles may be automatically associated with the developer when the developer logs into software organization's development system or environment. That is, log-on information may be associated with the developer's profile such that when the development system authenticates the log-on information entered by the developer, the association with the developer's profile is automatically made. As a result, when the developer modifies files, objects, portions of source code, etc., within the development system or environment, the tag associated with the developer's profile is added to metadata associated with the modified file, object, portion of source code, or the like.

The development system maintains metadata for each of the files, objects, portions of source code, etc. (hereafter simply referred to as "portions or source code" for simplicity). The metadata may be stored in the files, objects, portions of source code, or the like, or as a separate data structure associated with the files, objects, or portions of source code. In one illustrative embodiment, the metadata may be stored in a software development environment, such as in a source code control system, an integrated development tool, or the like.

The metadata may include, for example, the tags for developers that have modified the portions of source code, timestamps associated with such modifications, and the like. In one illustrative embodiment, this metadata may further comprise a measure of the complexity of the portion of source code. This measure may be relative to other portions of source code of the same software product such that the sum of the measures is equal to a total size of a predetermined measurement pool, or may be an independent measure of the complexity of the portion of source code which may still be able to be used to compare the complexity of the portion of source code with other portions of source code, but is not limited to a measurement pool size.

For example, a human developer, or automated mechanism, may associate function points with each portion of source code to identify its relative complexity with other portions of source code in the same software product. If a human developer assigns the associated function points, then the number of function points assigned may be based completely on the human developer's subjective evaluation of the complexity of the portion of source code. Of course, limits may be established within which the user may assign such function points, e.g., a minimum number of function points may be established, for example, based on the number of lines of code present in the portion of source code and a maximum number of function points may be established based on a remaining number of function points in a point pool, or the like. The number of function points associated with the portion of source code may be stored in the metadata for that portion of source code.

If an automated mechanism is utilized, then the portion of source code may be scanned and its attributes compared to criteria for applying function points. For example, the portion of source code may be scanned to identify the number of loops, nested loops, conditionals, etc. and may make use of a weighted function for calculating a number of function points to assign to the portion of source code based on its attributes. The identification of loops, nested loops, conditionals, and the like within source code through a scanning process is generally known in the art, although known scanning mechanism are not used in conjunction with a mechanism for assigning relative complexity measurements, such as function points, to portions of source code. As with the human developer assigned function points, the determined allocation of function points to a portion of source code based on an automated scanning mechanism may be maintained in metadata associated with the portion of source code for later use.

Thus, with the mechanisms of the illustrative embodiments, metadata annotations are added to portions of source code when those portions of source code are modified by a developer. These annotations may include an identification of the human developer responsible for the modifications, a timestamp associated with the modifications, a complexity measurement associated with the portion of source code, and the like. Moreover, as the complexity measurement changes over time, as the portion of source code is developed, maintained, modified, etc., the various complexity measurements may be maintained in this metadata in association with timestamp information to provide an indication of how the portion of source code has become more or less complex over time.

The metadata associated with portions of source code may be used for evaluation purposes at a later time to evaluate the sustainability of the software product. Scanning mechanisms may be used to scan the source code of the software product for this metadata so that it may be extracted and processed to provide various reports and views of the software product for evaluation by a human user. Moreover, the metadata extracted from the source code may be used in conjunction with other data structures, such as organizational chart data, personnel system data, and the like, to obtain further insight into the sustainability of the software product, as discussed in greater detail hereafter.

Figure 3:
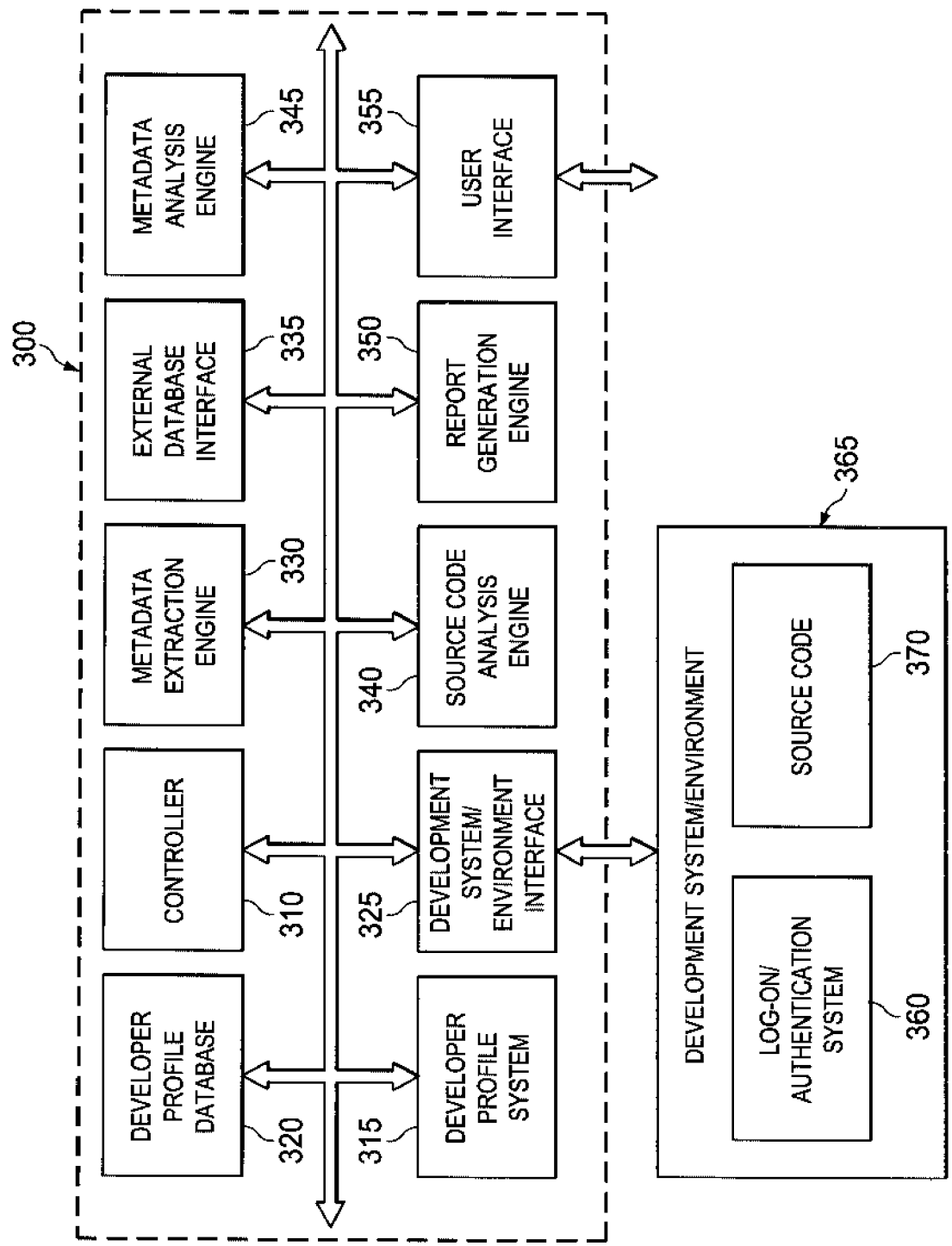
FIG. 3 is an exemplary block diagram of the primary operational components of a software sustainability evaluation engine in accordance with one illustrative embodiment.

FIG. 3 is an exemplary block diagram of the primary operational components of a software sustainability evaluation engine in accordance with one illustrative embodiment. As shown in FIG. 3, the software sustainability evaluation engine 300 includes a controller 310, a developer profile system 315, a developer profile database 320 coupled to the developer profile system 315, a development system/environment interface 325, a metadata extraction engine 330, an external database interface 335, a source code analysis engine 340, a metadata analysis engine 345, a report generation engine 350, and a user interface 355. The elements 310-355 may be implemented in software, hardware, or any combination of software and hardware. In one illustrative embodiment, the elements of FIG. 3 are implemented as software executed on one or more processors of one or more data processing systems.

The controller 310 controls the overall operation of the software sustainability evaluation engine 300 and orchestrates the operation of the other elements 315-355. The controller 310 may be coupled to the other elements via one or more buses, networks, wireless communication links, or any other data communication link through which the controller 310 may send control signals and/or data as well as receive messages and data from the elements 315-355. The controller 310 may send control signals to the various elements 315-355 in order to obtain access to the various functionalities of these elements 315-355 as discussed hereafter.

The developer profile system 315 provides an interface through which data in the developer profile database 320 may be accessed and new developer profiles may be created in the developer profile database 320. The developer profile system 315 may further interface with a log-on and authentication mechanism 360 of a development system or environment 365 via the development system/environment interface 325. Via the developer profile system 315, a human developer may establish a profile which may be used to track the developer's modifications to various portions of source code of one or more software products. As discussed above, the profile may have an associated identifier that may be inserted into metadata associated with portions of source code, e.g., files, objects, etc., along with timestamp information indicating when the particular developer modified the corresponding portion of source code. For example, the developer may be identified for a session with the development system or environment 365 via the log-on and authentication mechanism 360 which then correlates with the developer profile system 315 to retrieve the identifier for the developer's profile and then associates that developer profile with the session such that portions of source code modified by the developer have the associated developer's identifier inserted into their metadata.

Thus, via the developer profile system 315, developer identification information may be associated with portions of source code that are modified by the developer as well as timestamps for when the portions of source code are modified. This association of developer identification information and timestamps with the portions of source code may be used to generate reports indicative of the historical development and modification of the portions of source code. This historical information may provide insight into the sustainability of the software product with which the portions of source code are associated.

For example, in response to a request from a user via the user interface 355, such as from a client computing device or the like, the controller 310 may instruct the metadata extraction engine 330 to extract metadata from one or more identified portions of source code of a software product. That is, the user of a client computing device may send a request, via an mechanism provided by the user interface 355, that identifies a software product, a portion of source code of a software product, or the like, for which a sustainability evaluation is to be made. In response, the controller 310 recognizes the request and interfaces with the development system or environment 365, via the development system/environment interface 325, to retrieve the source code 370 corresponding to the request. This source code 370 is then provided to the metadata extraction engine 330 which scans the source code 370, or a designated portion of the source code 370 corresponding to the request, for metadata and extracts that metadata into a separate data structure with associations with the portions of source code to which they corresponding, e.g., pointers to files, objects, etc. Thus, via the metadata extraction engine 330, a data structure 380 specifying the developer identifiers and their timestamps for each portion of the source code is generated. That is, each portion of source code is represented in this data structure 380 along with the identifiers and timestamps of each developer that has modified the portion of source code such that a history of the development and modification of the portion of source code is obtained.

In addition, the source code 370 may also be provided to the source code analysis engine 340 which analyzes the structure of the source code 370, in a manner generally known in the art, to determine a hierarchical relationship between portions of the source code 370. As a result, a hierarchical tree data structure 385 representing the portions of source code 370 may be generated identifying the parent/child type relationships between the various portions of the source code 370. This hierarchical data structure 385 representing the hierarchical structure of the source code 370 may be correlated with the information in the extracted metadata data structure 380 to thereby identify the history of development and modification of the portions of source code 370 in a hierarchical manner.

In addition, the metadata analysis engine 345 may scan the extracted metadata data structure 380 to analyze the metadata and determine various sustainability characteristics for the various portions of source code 370. For example, the metadata analysis engine 345 may analyze the metadata to identify the number of developers that have been involved in the development and modification of the various portions of source code, how often a portion of source code has had to be modified, a complexity measure of the portion of source code, which developers have been most involved in modifications to the portions of source code recently, etc. Such analysis may provide insight as to which portions of code are harder to maintain and support, i.e. are more complex, which portions of code are easier to maintain, i.e. less complex, which developers are instrumental in maintaining the harder portions of code, which developers are most recently involved in supporting the harder/easier portions of code, and the like.

For example, the metadata may indicate that a relatively larger number of developers are involved in modifying a first portion of source code compared to a second portion of source code. Moreover, the difference in timestamps between modifications may be relatively smaller for the first portion of source code as opposed to the second portion of source code. These are all indications that the first portion of source code is relatively "harder" to sustain than the second portion of source code since it appears from the metadata that it requires a larger number of developers to modify it as well as the modifications being performed often. This could also be an indication that the portion of source code is not well conceived and thus, again would require more effort to sustain.

As a further exemplary analysis, the developer identifiers that are associated with the "harder" portions of source code may be determined and used to identify which personnel are required to sustain the more complex, or "harder," portions of the source code. Moreover, the developer identifiers that are associated with the most recent modifications to the portions of the source code may be identified an used as a basis for determining which personnel are driving innovations in the software product as well as who is providing input for future directions in which the software product is developing.

The results of the metadata analysis may be correlated with the source code structural analysis to provide a hierarchical representation of the portions of source code as well as their sustainability characteristics. In addition, the metadata analysis results and the structural analysis results may be correlated with other information in external databases, via the external database interface 335, to obtain even further insight into the sustainability of the software product. For example, such external databases may include an organizational database, employee database, or the like. By correlating the metadata and structural analysis results with such an external database, information regarding which personnel are still able to provide their expertise in sustaining the software product may be obtained. For example, it may be determined that John Smith is involved in modifications to the harder portions of source code of a software product and has been modifying the software product source code most recently. However, in correlating this information with an external organization and employee database, it may be determined that John Smith is no longer employed with the organization, or has been promoted to a position within the organization where he is no longer involved in working on the software product. Thus, in such a situation, the software product may be determined to have a diminished sustainability. Alternatively, it may be determined by such a comparison that John Smith is still involved with the team of individuals responsible for maintaining the software product and improving it and thus, the sustainability of the software product is enhanced.

As a further enhancement, the mechanisms of the illustrative embodiments may provide a functionality for specifying a complexity of portions of the source code within the metadata. For example, the development system may permit the developer who modifies a portion of source code to specify a relative measure of complexity for the portion of source code. For example, the developer may assign a number of function points to the portion of source code, either from a pool of function points for the software product, or independent of a pool. The metadata analysis engine 345 may further analyze such function points or relative measures of complexity to identify which portions of source code are more complex than others and which developers have been modifying those complex portions of source code.

In an alternative embodiment, rather than having the developer assign the relative measure of complexity, the source code analysis engine 340 may analyze the source code to determine its relative complexity and automatically assign a measure of this complexity in the metadata associated with the portion of source code, e.g., a number of function points. This relative complexity may be determined based on a number of different factors including, for example, a number of loops, number of nested loops, number of conditionals, a number of lines of code, etc.

The relative complexity measure may be stored in the metadata associated with the portion of source code. This relative complexity measure may be stored in the metadata after each modification from a developer, for example, such that the change in relative complexity of the portion of source code may be identified over time. These relative complexity measures may be stored in association with the developer identifier and timestamp of the modification. In this way, it can be determined where innovations in the software product occurred over a history of the development of the software product. This information may be correlated with the developer information in a similar manner as discussed above such that the developers associated with the innovations and most complex portions of the source code may be identified.

Thus, the mechanisms of the illustrative embodiments provide a functionality for association developer identifications with portions of source code that the developer modifies, timestamps of such modifications, measures of complexity associated with the portions of source code, and the like, for later use in performing software product sustainability analysis using an automated tool. The illustrative embodiments further provide mechanisms for scanning portions of source code, extracting the metadata identifying the developers, timestamps, and complexity measurements, and performing analysis on this metadata to determine the software product's sustainability. This analysis may involve performing structural analysis of the portions of source code and correlation of information with other external databases including organizational databases, employee databases, or the like. As a result, reports of various types identifying the individual developers that are responsible for the development and evolution of portions of source code, which portions of source code are "harder" or "easier" to sustain, which portions of source code are the focus of new innovations in the software product, and other sustainability valuations.

Figure 4:
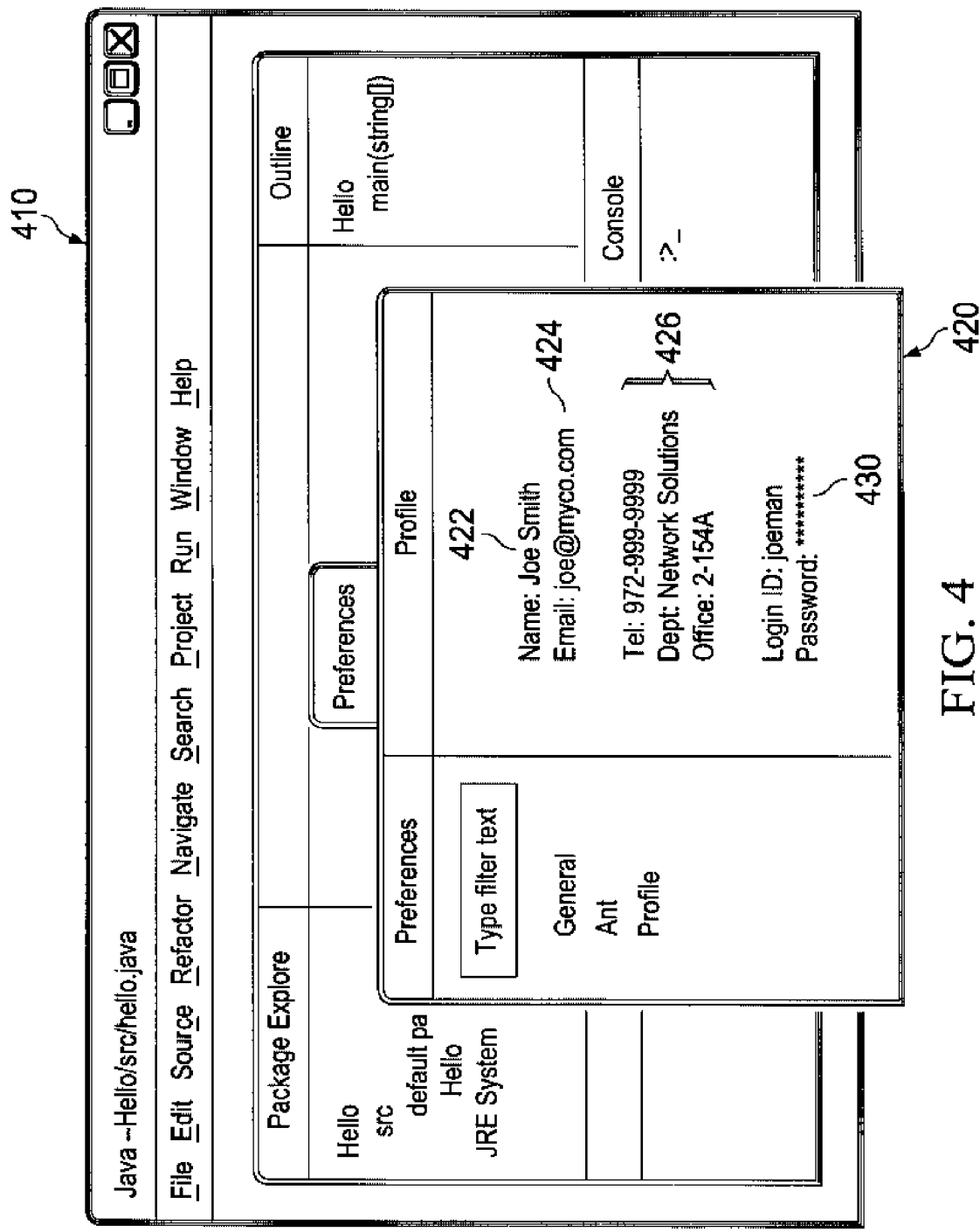
FIG. 4 is an exemplary diagram illustrating a user interface for establishing an author profile in accordance with one illustrative embodiment.

FIG. 4 is an exemplary diagram illustrating a user interface for establishing an author profile in accordance with one illustrative embodiment. As shown in FIG. 4, within a development environment 410, an interface 420 may be provided for a developer, i.e. a human user, to specify a profile for himself/herself for use in tracking modifications made by that developer to portions of source code via the development environment 410. As shown in FIG. 4, this interface 420 may comprise fields for entering a name of the developer 422, a contact address 424, such as an electronic mail (email) address, network address, or the like, and other personal contact information 426 include a telephone number, department identifier, office location, or the like. In addition, separate login information 430 may also be provided as part of the profile such that the developer's profile may be automatically identified in response to the developer logging onto the development environment 410. Other information that may be deemed pertinent to evaluating software product sustainability at a later time may also be included in the developer's profile depending on the particular implementation.

The information entered into the interface 420, or modified via the interface 420, may be stored as a profile entry in a developer profile database in association with an identifier for the developer that may be used to augment or otherwise mark portions of source code that have been modified by that developer. As discussed above, the developer's profile entry may be automatically retrieved in response to the developer logging onto the development environment 410. The identifier associated with the developer profile may then be associated with the session initiated by the developer via his/her logon to the development environment 410 such that any portion of source code modified by the developer during the session is automatically augmented or marked with the identifier of the developer and a timestamp of when the modification was performed.

It should be appreciated that the source code discussed in the present description may be provided in any programming language currently known or later developed, e.g., Hypertext Markup Language (HTML), eXtensible Markup Language (XML), Java, C++, Fortran, Basic, Python, or the like. Moreover, the source code may be provided as part of an object-oriented programming environment in which classes, objects, and the like may be the target of modifications and may be augmented or marked using the mechanisms of the illustrative embodiments. Moreover, the source code may be represented in various modeling languages, such as the Universal Modeling Language (UML) and the like. Essentially, the source code may be provided in any suitable format and in any suitable programming language without departing from the spirit and scope of the present invention.

The augmenting or marking of portions of source code is performed in metadata associated with the portions of source code. This metadata may be integrated into the portions of source code themselves, such as via tags in comments of the source code, in a designated metadata portion of the source code with pointers or identifiers of the portions of the source code to which the metadata corresponds, or in a separate data structure altogether that is linked with the source code. Essentially, the only requirement is that the metadata be maintained in such a manner that the metadata may be correlated with portions of source code with which they correspond.

Figures 5A, 5B:
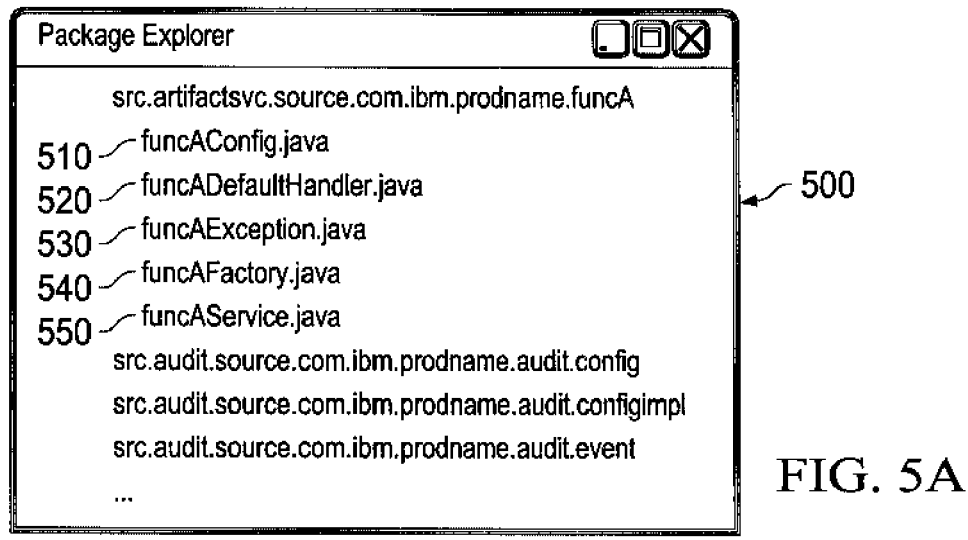
FIG. 5A is an exemplary diagram illustrating an example of a source code layout.
FIG. 5B illustrates the same source code as in FIG. 5A with developer tags inserted in appropriate locations within the source code in accordance with one illustrative embodiment.

FIG. 5A is an exemplary diagram illustrating an example of a source code layout. As shown in FIG. 5A, the source code 500 is for a package "Explorer" provided in the Java programming language. This source code 500 includes a number of references to objects 510-550 that are utilized by the Explorer package.

FIG. 5B illustrates the same source code 500 with developer tags inserted in appropriate locations within the source code 500 in accordance with one illustrative embodiment. As shown in FIG. 5B, each of the objects 510-550 have associated developer tags, timestamps, and complexity measures 560-595, which are metadata, for each of the developers that have modified the associated object 510-550. Thus, for example, the developers John Doe and Craig LaTour have been responsible for modifications to objects 510-530 and developer Hedy Lamar has been responsible for modifications to objects 530-550. Moreover, it can be determined that Craig LaTour has been responsible for the most recent modifications to objects 510-520 and Hedy Lamar has been responsible for the most recent modifications to objects 530-550. Furthermore, it can be determined that object 530 appears to be the most complex object to sustain based on its relatively high complexity measure, the number of developers that have been responsible for modifying the object 530, and the difference between timestamps for modifications to the object 530.

Additionally, it can be seen that objects 510-520 either require less effort to sustain or are no longer utilized by the software product since the latest modifications were long ago based on a comparison of the modification timestamps with a current time. Yet another insight is that Hedy Lamar appears to be of importance to the sustainability of the software product since Hedy Lamar is responsible for modifications to the most complex object 530, has been responsible for the most recent modifications to objects 530-550, and furthermore, is the only one responsible for modifications to objects 540-550. Thus, if Hedy Lamar were to no longer be able to support the software products, there may be a relatively higher likelihood that problems and innovations with regard to objects 530-550 may not be able to be adequately addressed. It is these types of insights and analysis that may be performed automatically by the mechanisms of the illustrative embodiments. That is, logic is provided in the various elements of FIG. 3 to perform such analysis and generate reports that identify the results of such analysis to a user.

The various exemplary types of analysis and outputs that may be generated by the software sustainability evaluation engine of the illustrative embodiments will be described with reference to the reports that may be generated as depicted in FIGS. 6-8D hereafter. These reports may be generated by the software sustainability evaluation engine 300, in FIG. 3, in response to a user request and may be output to the user via the user interface 355 in a graphical and/or textual manner on a display device of a computing system associated with the user that submitted the request. It should be appreciated that the analysis and outputs described hereafter are only exemplary and other types of analysis and outputs may be generated, as will be apparent to those of ordinary skill in the art in view of the present description, without departing from the spirit and scope of the present invention.

Figure 6:
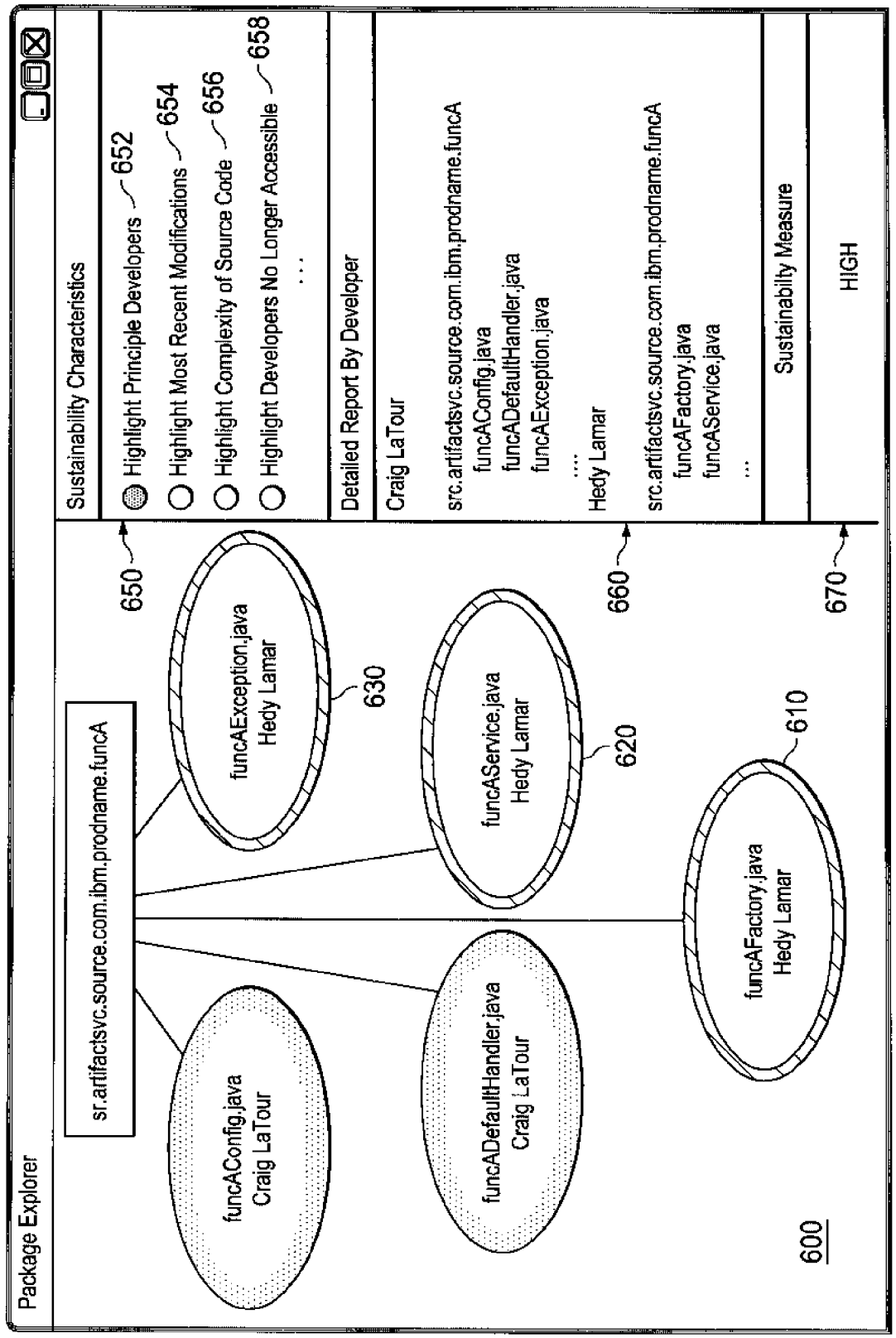
FIG. 6 is an exemplary diagram illustrating a report identifying a structure of the source code and the developers responsible for sustaining the various portions of source code.

FIG. 6 is an exemplary diagram illustrating a report identifying a structure of the source code and the developers responsible for sustaining the various portions of source code. As shown in FIG. 6, the report 600 illustrates the source code in a hierarchical manner. Such a hierarchical representation of source code is generally known in the art and is often used in visualization tools for UML programming and the like. However, the known hierarchical representations of source code do not provide information regarding the developers that are responsible for sustaining the various portions of source code, the timestamps associated with the modifications to the portions of source code, or a measure of the complexity of the various portions of source code, as with the illustrative embodiments herein.

The software sustainability evaluation engine 300, in generating the report 600 in FIG. 6, may analyze the structure of the source code and the metadata associated with the various portions of the source code, to identify the principle developers currently responsible for supporting the development, innovations, and the like, for the various portions of source code. The software sustainability evaluation engine 300 may assign different visual representations for the different principle developers and represent the portions of source code in the report 600 using the different visual representations for the various portions of source code that the particular developers are responsible. Thus, for example, if Hedy Lamar is determined to be the principle developer of objects 610-630, then those objects are represented with the visual representation associated with Hedy Lamar, e.g., a different color, fill pattern, shading, font, highlighting or the like. In this way, through a very quick view of the report 600, one can determine which portion of the source code, and how much of the source code, is associated with different principle developers.

Similarly, another visual representation may be associated with portions of source code based on the latest timestamp for a modification of that portion of source code. For example, one color, highlight, fill pattern, font, or the like, may be associated with portions of source code that are determined to be recently modified, a different representation may be provided for portions of source code that are determined to be moderately recently modified, and a third representation may be provided for portions of source code that have not been modified recently. In this way, it can further be determined which portion of the source code, and how much of the source code, is experiencing recent modifications, is not experiencing recent modifications, and which portions may be obsolete or no longer used.

Further, different representations may be associated with different levels of complexity of the portions of source code, which portions have a principle developer that is no longer part of the organization or is not in a role where that developer works with the software product, and the like. As mentioned above, the complexity measures in the metadata may be used to provide an indication of the relative complexity of the portions of source code within the software product. This complexity measure may be user defined or automatically determined through analysis of the structure and organization of the portion of source code. These complexity measures may be compared against predetermined thresholds to identify portions of source code that are "hard" to sustain, "easy" to sustain, or have a "medium" difficulty of sustainability. These various levels of complexity may be associated with different visual representations which may then be used with the representations of the corresponding portions of source code in the report 600.

Similarly, as mentioned above, the identifiers of principle developers for the portions of source code may be correlated with organization and employee database information to determine which developers are still employed with the organization and where they currently are within the organization. This information may be correlated with information regarding the organization departments associated with the software product to determine if the principle developers are still in a position within the organization to support the various portions of the source code. Various representations may be associated with portions of source code where the principle developer is still employed with the organization and is in a position to support the portions of source code, the principle developer is still employed with the organization but is not in a position to support the portions of source code, and the principle developer is no longer employed by the organization.

These various representations may be selectable via a user interface 650 associated with the report 600. For example, through the user interface, the user viewing the report 600 may select to view the software product structure with representations for different developers shown 652. The user may then select an option 654 to view the software product structure with representations for recentness of modifications to the portions of the source code being displayed. The user may also select an option 656 to view the software product structure with representations based on complexity of the various portions of the source code. Another selectable option 658 is for the user to view the software structure with representations for portions of source code based on personnel support. Other options for various representations may further be provided in other implementations of the present invention.

In addition, other report formats may be displayable in other panes or windows of the report 600. For example, a detailed report 660 may be provided in a separate window or in a separate portion of the report 600 to provide another view of the report 600 with detailed information that may not otherwise be viewable at the level depicted in the report 600. This detailed report may provide information regarding the overall software product depicted in the report 600, individual portions of source code whose objects are selected in the report 600, or the like. In addition, a sustainability measure 670 may be calculated and displayed, as described in greater detail hereafter. Thus, via the report in FIG. 6, a user may obtain various views of the software product structure with each view providing a different insight into the sustainability of the software product.

Figures 7, 8A:
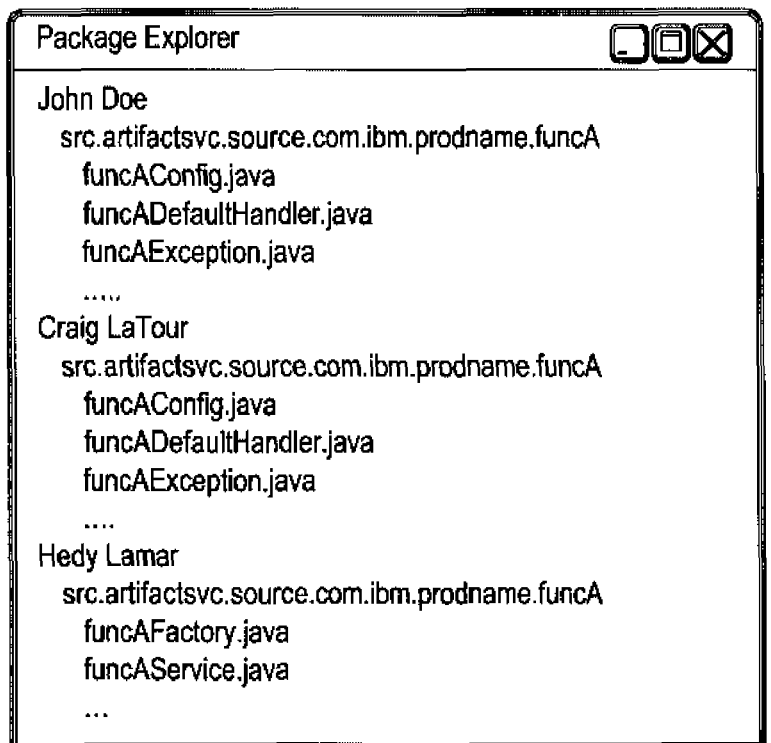

FIG. 7 is an exemplary diagram of an alternative report that may be generated in accordance with one illustrative embodiment. The report 700 in FIG. 7 is organized by developer. Thus, each developer's identifier is listed in association with identifiers of the portions of source code that they have modified and the timestamps associated with the modifications. The portions of source code associated with the developer's identifier may be listed in program order or may be listed in order of most recent to least recent modification timestamp, for example. In the latter case, the report 700 would quickly inform a user of which portions of the source code the particular developer has been most recently involved in supporting or sustaining.

A report such as that shown in FIG. 7 may be useful for many different reasons. As one exemplary use of the report 700, this report 700 may be used to identify which portions of the software product are being worked on by particular individuals. From this, a developer can determine who is working on, or has worked on, functionality of the software product that impacts the portions of the software product that the developer is himself/herself working on. Furthermore, one can quickly determine from this report 700 how much of the software product each person or team is working on for purposes of determining relative workloads and possibly reallocating responsibilities across developers or development teams.

FIGS. 8A-8D are exemplary diagrams of other alternative reports, that may be generated in accordance with one illustrative embodiment, in which complexity of the portions of source code is the key factor. In FIG. 8A, the report 800 is organized by levels of complexity with the corresponding portions of source code being listed below the categories of complexity. Thus, for example, there may be three categories of complexity, "hard," "medium," and "easy." As previously mentioned above, these levels of complexity may have associated predetermined values against which a measure of complexity may be compared in order to determine if a portion of source code falls within the category of complexity. Based on results of the comparison of the measure of complexity of a portion of source code, which again may be user specified or automatically determined based on the structure and characteristics of the portion of source code, an identifier of the portion of source code may be added to an appropriate region of the report 800 in association with the category of complexity into which the portion of source code falls. In addition, the actual measure of complexity, e.g., function points, may be listed in association with the identifier of the portion of source code. Other information, such as the number of lines of code, may also be displayed in association with the identifier of the portion of source code.

Figure 8B:
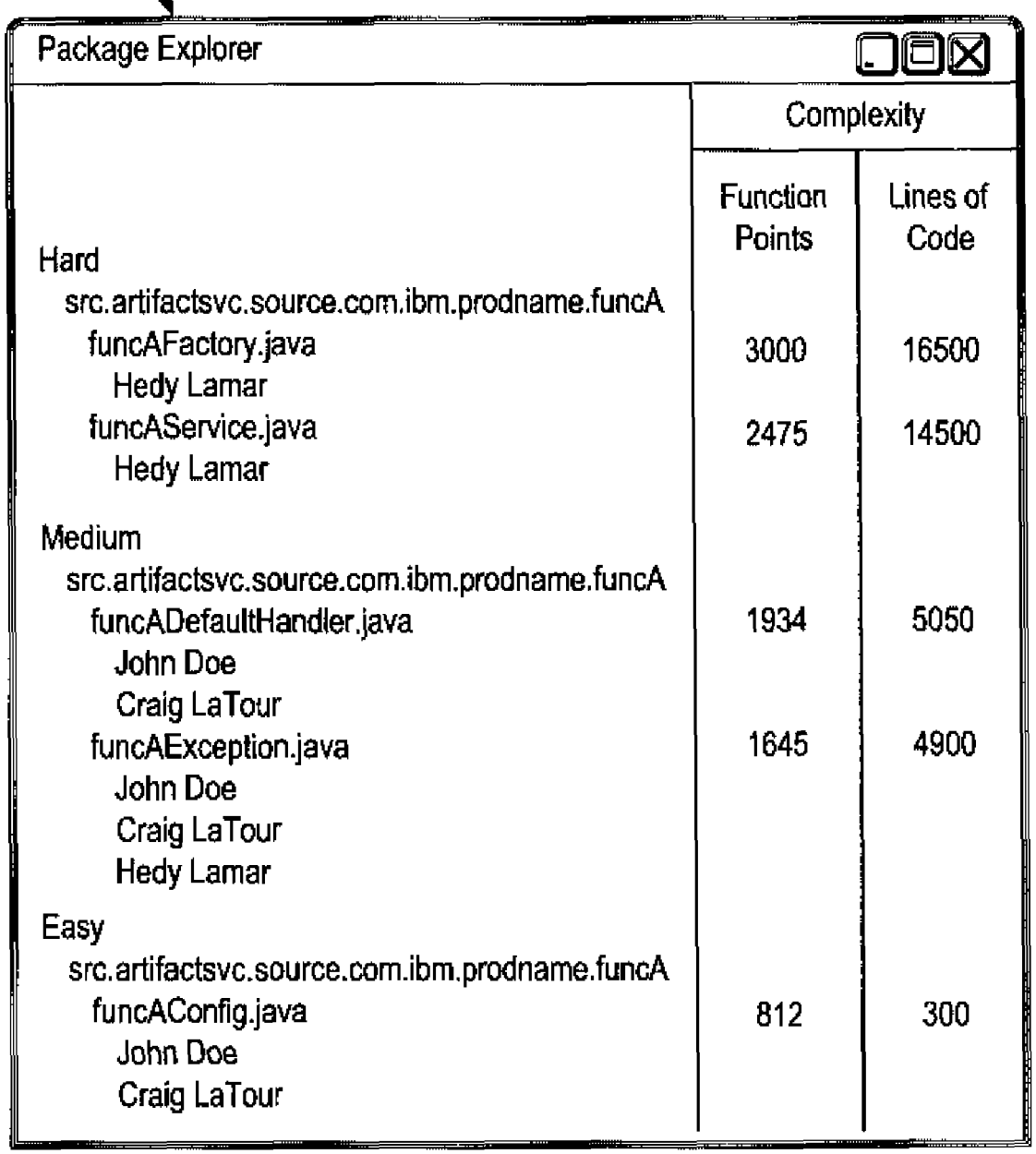

FIG. 8B shows a similar report 820 in which, in addition to the identifiers of the various portions of the source code being provided in association with the respective complexity categories, the developers that have been involved in modifying the portions of source code are also displayed. In this way, one can see from the report 820 which developers are involved in sustaining the more difficult to sustain portions of source code. Thus, for example, as shown in FIG. 8I, Hedy Lamar is responsible for modifications to portions of source code in both the hard and medium sustainability categories while John Doe and Craig LaTour are both associated with modifications in the middle and easy sustainability categories. Thus, if Hedy Lamar were to no longer part of the software organization, then it may be very difficult to sustain the portions of source code in the hard category and somewhat difficult to sustain the portions of source code in the medium category.

FIG. 8C is another similar report 830 in which the report 830 is organized primarily by developer and then secondarily by complexity category. As shown in FIG. 8C, each developer is listed with associated subsections corresponding to teach of the complexity categories. From this report 830 it can be determined how much of the software product, in each type of complexity category, each developer has been a part of sustaining.

FIG. 8D shows another report 840 in which the report 840 is organized primarily by developer and then provides information regarding the number of lines of code (LOC) in each of the complexity categories each developer is responsible for having modified or maintained. Again, this gives an indication as to who is responsible for sustaining the harder portions of source code. This information may be correlated with organizational and employee database information to determine if the persons responsible for sustaining the harder portions of source code are still in a position to provide support for the software product.

All of the information provided in the various reports and/or through the various analyses discussed above may be used as a basis for obtaining a measure of the sustainability of the software product as a whole. The controller 310 and/or one or more of the analysis engines in the software sustainability analysis engine 300 of FIG. 3 may be provided with logic for evaluating all of this information to obtain an overall indication of sustainability of the software product. For example, the logic may provide a weighted function for calculating a sustainability value based on how many developers responsible for modifications to the hardest portions of source code are still accessible in the organization, how many portions of source code are obsolete or unused, how many developers overall are required to sustain the software product, etc. Such evaluation of these various characteristics of the sustainability of the software product may be made using an intelligent system such as an expert system, neural network, or the like.

The result may be a sustainability value which may then be compared to predetermined thresholds for categories of sustainability of the software product. The result of a comparison of the calculated sustainability value to the predetermined thresholds may result in an indication of whether the software product is highly sustainable, moderately sustainable, or unlikely to be sustainable. The indication of sustainability may be output with the report so that the overall sustainability may be made apparent to the user.

Such sustainability evaluations may be made with regard to all of the sustainability characteristics or with regard to particular types of sustainability characteristics. Thus, for example, depending upon the particular report and/or representation currently selected for the report, a different sustainability evaluation may be made and the result output to the user. For example, with the report 600 in FIG. 6, depending upon the particular representation selected, a different overall sustainability indication for the software product may be output. The sustainability indication may be based upon the particular characteristic being represented in the report, e.g., developers associated with portions of source code, complexity of portions of source code, etc. Thus, if a representation is selected for identifying which portions of source code are associated with different developers, then the sustainability indication may be based upon whether those developers are still part of the software organization and are in a position where they can support the software product. If a representation is selected for identifying complexity of the source code portions, then a sustainability indication may be based on whether developers associated with the hardest to sustain portions of code are still accessible within the organization.

Alternatively, rather than providing a separate sustainability measure based on the particular report or representation being displayed or generated, a single sustainability value may be calculated based on the determined factors discussed above so as to give the evaluator of the software product with a single indication of the sustainability of the software product. For example, all of the information obtained using the mechanisms of the illustrative embodiments may be combined and correlated into a single sustainability measure used to assess risk associated with the code of the software product. Thus, for example, a set of rules for evaluating the various pieces of information may be established for evaluating the sustainability of the code of the software product based on modification dates, number of modifications over a selected period of time, number of developers still on staff, number of lines of code, determined complexity rating of portions of code, experience levels of developers still on staff, and the like. The various elements of this evaluation may be weighted based on relative importance to the evaluator. The sustainability measure value may be a straight numerical value within a predetermined range, a general descriptor of "easy, moderate, or hard", or the like. The evaluator may establish their own scale of sustainability ratings, if desired, with thresholds for the various categories of sustainability being specified against which the actual calculated sustainability measure may be compared in order to specify the level of sustainability of the software product. For example, a rule for generating a sustainability measure may be composed as follows:

If {date modified>18 months ago} and {# mods over 12 mo. period prior to last mod<3} and [{at least one developer still present} or {LOC<50} or {function points<10}] then code is "easily sustainable"/"low risk"

It can be appreciated that other similar type rules may also be generated for evaluating a combination of the various sustainability characteristic information gathered by the mechanisms of the illustrative embodiments. These other rules may be more or less complex than the example given above without departing from the spirit and scope of the illustrative embodiments.

It can further be appreciated from the above that there are many different types of analysis that may be performed based on the mechanisms of the illustrative embodiments and many different uses to which the various reports generated by the mechanisms of the illustrative embodiments may be put. Some of the possible analyses and uses have been discussed above. For example, another analysis that may be performed, based on the mechanisms of the illustrative embodiments, may be to examine the dates of modification to look for portions of code that are stable (e.g., no recent modifications/fixes), portions of code that are out-of-date (e.g., not modified in five years), and portions of code that may be "throw away" (e.g., written, fixed over short period, then not modified in a very long time).

Moreover, from the metadata associated with the source code it can be determined if the metadata associated with the source code indicates a high complexity or high number of lines of code. A sustainability measure may be calculated based on these determinations may be calculated. For example, a relatively low sustainability measure may be calculated if the complexity of the source code is high, or the number of lines of code is high, and one or more of the persons responsible for modification of the source code, e.g., an original developer of the source code, are not in a current position to provide support for the software product.

Similarly, a determination based on the metadata may be performed as to whether the source code has been modified within a specified time period, e.g., within the last 6 months. Moreover, a determination of whether the pattern of modifications, e.g., the number of modifications, time spacing between the modifications, most recent modification, etc., indicates a need for continued support of the source code by persons responsible for the modifications to the source code, e.g., original developers of the source code and the like. A relatively low sustainability measure may be calculated if the source code has been modified within the specified time period or the pattern of modifications of the source code indicates a need for continued support of the source code, and one or more persons responsible for modification of the source code are not in a current position to provide support for the software product. Of course a relatively high sustainability measure may be made if the opposite characteristics are present.

Figure 9:
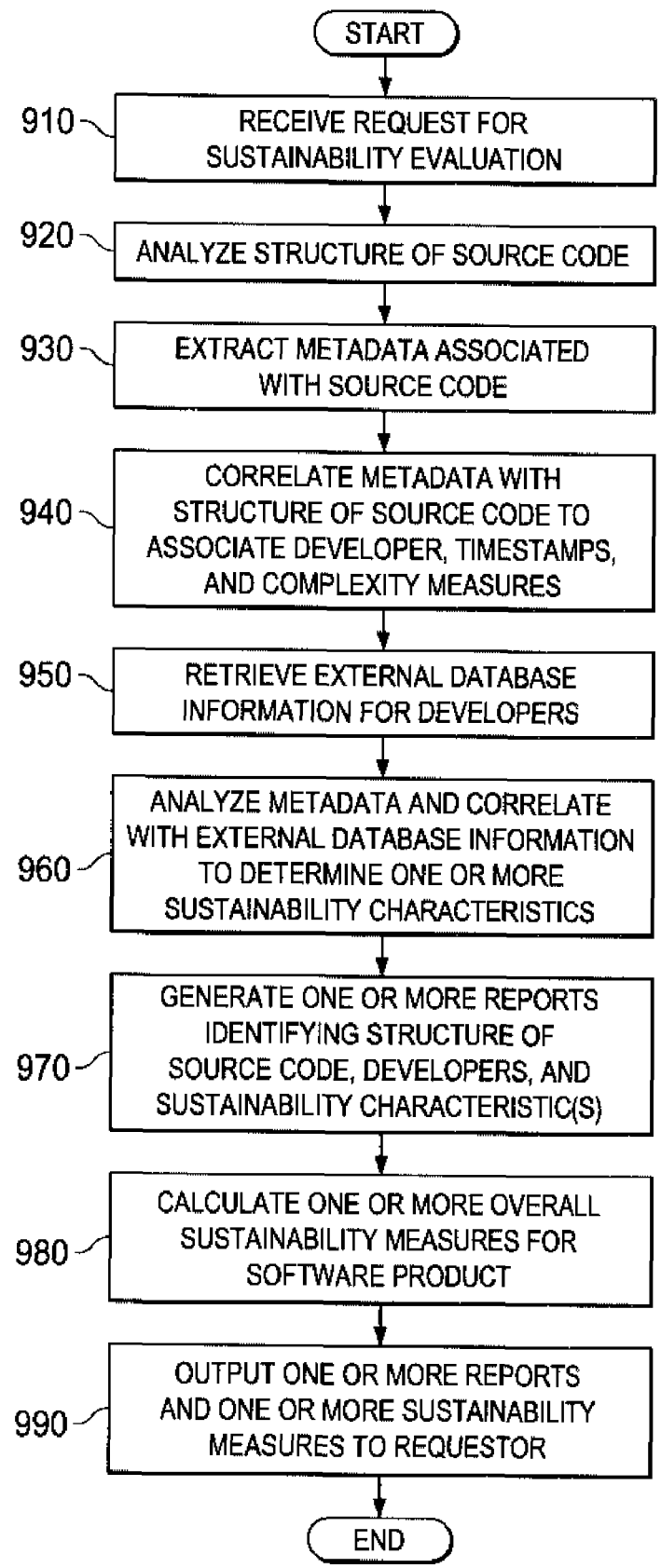
FIG. 9 is a flowchart outlining an overall operation for determining the sustainability of a software product in accordance with one illustrative embodiment.

FIG. 9 is a flowchart outlining an overall operation for determining the sustainability of a software product in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As shown in FIG. 9, the operation starts with a request being received to perform a sustainability evaluation of an identified software product (step 910). The structure of the source code of the software product is analyzed to identify a hierarchical representation of the software product (step 920). Metadata associated with the source code of the software product is extracted (step 930). The extracted metadata is correlated with the structure of the software product to associated developer identifiers, timestamps, and complexity measures with corresponding portions of source code of the software product (step 940). External database information, e.g., organizational database information, employee database information, and/or the like, is retrieved corresponding to the developer identifiers (step 950). The metadata is analyzed and correlated with the external database information to determine one or more sustainability characteristics for the portions of source code (step 960). One or more reports are generated for identifying the structure of the source code, the developers associated with portions of the source code, and the one or more sustainability characteristics (step 970). One or more overall sustainability measures for the software product are calculated based on the one or more sustainability characteristics, or a subset thereof (step 980). The one or more reports and one or more sustainability measures are output to the computing device from which the request was received (step 990) and the operation terminates.

Thus, the illustrative embodiments provide a mechanism for automating a sustainability evaluation of a software product. The mechanisms of the illustrative embodiments provide greater insight into the sustainability of a software product based on the historical evolution of the software product through records identifying the developers that modify the portions of source code of the software products. Moreover, insight into which developers are more crucial to the sustainability of the software product than others may be obtained by correlating developer information with complexity information for the various portions of source code. All of this information and more may be easily discerned via the reports generated and output by the mechanisms of the illustrative embodiments which allow a user to obtain various views of the sustainability of the software product based on various sustainability characteristics.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for providing an output indicative of a sustainability of a software product, comprising:
    retrieving metadata associated with source code of the software product, the metadata identifying at least one historical characteristic of the source code of the software product, the at least one historical characteristic identifying information regarding the development or maintenance of the source code of the software product;
    correlating the metadata with current information of an organization responsible for providing the software product;
    determining a sustainability measure of the source code of the software product based on results of correlating the metadata with the current information of the organization,
    wherein determining a sustainability of the source code of the software product based on results of correlating the metadata with the current information of the organization comprises:
    determining if at least one person responsible for modification of the source code is currently in a position to provide support for the software product based on the correlation of the metadata with the current information of the organization; and
    calculating the sustainability measure based on results of determining if at least one person responsible for modification of the source code is currently in a position to provide support for the software product; and
    generating one or more report outputs based on the determined sustainability measure of the source code of the software product.

2. The method of claim 1, wherein the metadata comprises at least one of one or more identifiers associated with one or more persons responsible for modifying the source code, one or more timestamps associated with one or more modifications of the source code, or one or more measures of complexity of the source code.

3. The method of claim 1, wherein the metadata comprises at least one measure of complexity of the source code, and wherein the at least one measure of complexity is a measure of the relative complexity of the source code compared to other portions of source code of the same software product.

4. The method of claim 3, wherein the at least one measure of complexity is automatically assigned to the source code and stored in the metadata by scanning the source code to identify attributes of the source code, comparing the attributes to criteria for assigning function points to the source code, and calculating a total number of function points for the source code based on a function of the attributes compared to the criteria.

5. The method of claim 3, wherein the at least one measure of complexity comprises a history having a plurality of measures of complexity, each measure of complexity being associated with a corresponding timestamp in the metadata of a modification to the source code.

6. The method of claim 1, wherein calculating the sustainability measure comprises:
    determining if the metadata associated with the source code indicates a high complexity or high number of lines of code; and
    calculating a relatively low sustainability measure if the complexity of the source code is high, or the number of lines of code is high, and one or more of the persons responsible for modification of the source code are not in a current position to provide support for the software product.

7. The method of claim 1, wherein calculating the sustainability measure comprises:
    determining if the source code has been modified within a specified time period;
    determining if a pattern of modifications of the source code indicates a need for continued support of the source code; and
    calculating a relatively low sustainability measure if the source code has been modified within the specified time period or the pattern of modifications of the source code indicates a need for continued support of the source code, and one or more persons responsible for modification of the source code are not in a current position to provide support for the software product.

8. A computer program product comprising a non-transitory computer readable medium having a computer readable program, wherein the computer readable program, when executed on a computing device, causes the computing device to:
    retrieve metadata associated with source code of the software product, the metadata identifying at least one historical characteristic of the source code of the software product, the at least one historical characteristic identifying information regarding the development or maintenance of the source code of the software product;
    correlate the metadata with current information of an organization responsible for providing the software product;

determine a sustainability measure of the source code of the software product based on results of correlating the metadata with the current information of the organization, wherein the computer readable program causes the computing device to determine a sustainability of the source code of the software product based on results of correlating the metadata with the current information of the organization by:

determining if at least one person responsible for modification of the source code is currently in a position to provide support for the software product based on the correlation of the metadata with the current information of the organization; and calculating the sustainability measure based on results of determining if at least one person responsible for modification of the source code is currently in a position to provide support for the software product; and generate one or more report outputs based on the determined sustainability measure of the source code of the software product.

9. The computer program product of claim 8, wherein the metadata comprises at least one of one or more identifiers associated with one or more persons responsible for modifying the source code, one or more timestamps associated with one or more modifications of the source code, or one or more measures of complexity of the source code.

10. The computer program product of claim 8, wherein the metadata comprises at least one measure of complexity of the source code, and wherein the at least one measure of complexity is a measure of the relative complexity of the source code compared to other portions of source code of the same software product.

11. The computer program product of claim 10, wherein the at least one measure of complexity is automatically assigned to the source code and stored in the metadata by scanning the source code to identify attributes of the source code, comparing the attributes to criteria for assigning function points to the source code, and calculating a total number of function points for the source code based on a function of the attributes compared to the criteria.

12. The computer program product of claim 10, wherein the at least one measure of complexity comprises a history having a plurality of measures of complexity, each measure of complexity being associated with a corresponding timestamp in the metadata of a modification to the source code.

13. The computer program product of claim 8, wherein the computer readable program causes the computing device to calculate the sustainability measure by:

determining if the metadata associated with the source code indicates a high complexity or high number of lines of code; and calculating a relatively low sustainability measure if the complexity of the source code is high, or the number of lines of code is high, and one or more of the persons responsible for modification of the source code are not in a current position to provide support for the software product.

14. The computer program product of claim 8, wherein the computer readable program causes the computing device to calculate the sustainability measure by:

determining if the source code has been modified within a specified time period;

determining if a pattern of modifications of the source code indicates a need for continued support of the source code; and calculating a relatively low sustainability measure if the source code has been modified within the specified time period or the pattern of modifications of the source code indicates a need for continued support of the source code, and one or more persons responsible for modification of the source code are not in a current position to provide support for the software product.

15. The computer program product of claim 8, wherein the computer readable program comprises instructions that are stored in a computer readable storage medium in a data processing system, and wherein the instructions were downloaded over a network from a remote data processing system.

16. The computer program product of claim 8, wherein the computer readable program comprises instructions that are stored in a computer readable storage medium in a server data processing system, and wherein the instructions are downloaded over a network to a remote data processing system for use in a computer readable storage medium with the remote data processing system.

17. A data processing system, comprising:

at least one processor; and a memory coupled to the at least one processor, wherein the memory comprises instructions which, when executed by the at least one processor, cause the at least one processor to:

retrieve metadata associated with source code of the software product, the metadata identifying at least one historical characteristic of the source code of the software product, the at least one historical characteristic identifying information regarding the development or maintenance of the source code of the software product;

correlate the metadata with current information of an organization responsible for providing the software product;

determine a sustainability measure of the source code of the software product based on results of correlating the metadata with the current information of the organization, wherein the instructions cause the at least one processor to determine a sustainability of the source code of the software product based on results of correlating the metadata with the current information of the organization by:

determining if at least one person responsible for modification of the source code is currently in a position to provide support for the software product based on the correlation of the metadata with the current information of the organization; and calculating the sustainability measure based on results of determining if at least one person responsible for modification of the source code is currently in a position to provide support for the software product; and generate one or more report outputs based on the determined sustainability measure of the source code of the software product.

* * * * *